United States Patent
Hagbi et al.

(10) Patent No.: US 8,644,551 B2
(45) Date of Patent: Feb. 4, 2014

(54) SYSTEMS AND METHODS FOR TRACKING NATURAL PLANAR SHAPES FOR AUGMENTED REALITY APPLICATIONS

(75) Inventors: Netanel Hagbi, Be'er Sheva (IL); Oriel Y. Bergig, D.N. Lachis (IL); Jihad A. Elsana, Lakia (IL)

(73) Assignee: Flyby Media, Inc., New York, NY (US)

( * ) Notice: Subject to any disclaimer, the term of this patent is extended or adjusted under 35 U.S.C. 154(b) by 198 days.

(21) Appl. No.: 12/906,019

(22) Filed: Oct. 15, 2010

(65) Prior Publication Data

US 2011/0129118 A1    Jun. 2, 2011

Related U.S. Application Data (60) Provisional application No. 61/251,757, filed on Oct. 15, 2009.

(51) Int. Cl.
*G06K 9/00* (2006.01)
*G06K 9/36* (2006.01)

(52) U.S. Cl.
USPC .......................................... 382/103; 382/276

(58) Field of Classification Search
USPC ........................................................ 382/103
See application file for complete search history.

(56) References Cited

U.S. PATENT DOCUMENTS

| | | | |
|---|---|---|---|
| 2002/0191862 A1* | 12/2002 | Neumann et al. | 382/284 |
| 2006/0139314 A1* | 6/2006 | Bell | 345/156 |
| 2009/0028439 A1* | 1/2009 | Elangovan et al. | 382/209 |

OTHER PUBLICATIONS

Lamden et al, Object Recognition by Affine Invariant Matching, Mar. 1988, Courant Institute of Mathematical Sciences, New York University, Robotics Report No. 136, pp. 1-32.*

Mittrapiyanuruk, Pradit, A Memo on How to Use the Levenberg-Marquardt Algorithm for Refining Camera Calibration Parameters, Nov. 2006 (see p. 11 for web publication date), Robot Vision Laboratory, Purdue University, pp. 1-11.*

Lhuillier, et al, A Quasi-Dense Approach to Surface Reconstruction from Uncalibrated Images, Mar. 2005, IEEE Transactions on Pattern Analysis and Machine Intelligence, vol. 27, No. 3, pp. 1-16.*

Vemuri et al, Snake Pedals: Compact and Versatile Geometric Models with Physics-Based Control, May 2000, IEEE Transactions on Pattern Analysis and Machine Intelligence, vol. 22, No. 5, pp. 1-15.*

APA Style—Do you use brackets the same way you use parentheses?, 2012, American Psychological Association, p. 1.*

Kato, H., Billinghurst, M., Pouipyrev, I., Imamoto, K., and Tachibana, K., "Virtual Object Manipulation on a Table-Top AR Environment", International Symposium on Augmented Reality, pp. 111-119, 2000.

(Continued)

*Primary Examiner* — Utpal Shah
(74) *Attorney, Agent, or Firm* — Fish & Richardson P.C.

(57) ABSTRACT

The present disclosure relates to systems and methods for tracking planar shapes for augmented-reality (AR) applications. Systems for real-time recognition and camera six degrees of freedom pose-estimation from planar shapes are disclosed. Recognizable shapes can be augmented with 3D content. Recognizable shapes can be in form of a predefined library being updated online using a network. Shapes can be added to the library when the user points to a shape and asks the system to start recognizing it. The systems perform shape recognition by analyzing contour structures and generating projective invariant signatures. Image features are further extracted for pose estimation and tracking. Sample points are matched by evolving an active contour in real time.

17 Claims, 9 Drawing Sheets

(56) References Cited

OTHER PUBLICATIONS

Lee, G.A., Nelles, C., Billinghurst, M., and Kim, G.J., "Immersive Authoring of Tangible Augmented Reality Applications". Proceedings of the 3rd IEEE/ACM International Symposium on Mixed and Augmented Reality, pp. 172-181, 2004.

Lepetit, V. and Fua, P., "Monocular Model-Based 3D Tracking of Rigid Objects: A Survey". Foundations and Trends in Computer Graphics and Vision, pp. 1-89, 2005.

Hagbi, N., Bergig, O., El-Sana, J., Kedem, K., and Billinghurst, M., "In-Place Augmented Reality", International Symposium on Mixed and Augmented Reality, pp. 135-138, 2008.

Hoff, W.A., Nguyen, K., and Lyon, T., "Computer vision-based registration techniques for augmented reality", Proceedings of Intelligent Robots and Control Systems XV, Intelligent Control Systems and Advanced Manufacturing, pp. 538-548, 1996.

State, A., Hirota, G., Chen, D., Garett, W., and Livingston, M., "Superior augmented reality registration by integrating landmark tracking and magnetic tracking", Computer Graphics, SIGGRAPH Proceedings, pp. 429-438, 1996.

Kato, H. and Billinghurst, M., "Marker Tracking and HMD Calibration for a video-based Augmented Reality Conferencing System", $2^{nd}$ International Workshop on Augmented Reality, 1999.

Fiala, M., ARTag, "An Improved Marker System Based on ARToolkit", NRC Institute for Information Technology, NRC 47166/ ERB-1111, 2004.

Schmalstieg, D. and Wagner, D., "Experiences with Handheld Augmented Reality", The Sixth IEEE and ACM International Symposium on Mixed and Augmented Reality, 2007.

Rothwell, C.A., Zisserman, A., Forsyth, D.A., and Mundy, J.L., "Canonical Frames for Planar Object Recognition", Proceedings of the Second European Conference on Computer Vision, pp. 757-772, 1992.

Zisserman, A., Forsyth, D., Mundy, J., Rothwell, C., Liu, J., and Pillow, N., "3D object recognition using invariance". Artificial Intelligence, pp. 239-288, 1995.

Drummond, T. and Cipolla, R., "Visual tracking and control using Lie algebras", Computer Vision and Pattern Recognition, pp. 652-657, 1999.

Alberto Ruiz, Pedro E. López de Teruel and Lorenzo Fernández., "Robust Homography Estimation from Planar Contours Based on Convexity", European Conference on Computer Vision, pp. 107-120, 2006.

Andrew W. Fitzgibbon., "Robust registration of 2D and 3D point sets", In Proc. British Machine Vision Conference, vol. II, pp. 411-420, 2001.

Rothwell, C.A., Zisserman, A., Forsyth, D., and Mundy, J., "Planar Object Recognition using Projective Shape Representation". International Journal of Computer Vision, pp. 57-99, 1995.

Carlsson, S., "Projectively Invariant Decomposition and Recognition of Planar Shapes". International Journal of Computer Vision, pp. 193-209, 1996.

Fitzgibbon, A.W., Pilu, M., and Fisher, R.B., "Direct least-squares fitting of ellipses". IEEE Transactions on Pattern Analysis and Machine Intelligence, pp. 476-480, 1999.

Kass, M., Witkin, A., and Terzopoulos, D., "Snakes: Active contour models". International Journal of Computer Vision, pp. 321-331, 1988.

Chan, T.F. and Vese, L.A., "Active Contours without Edges". IEEE Transactions on Image Processing, pp. 266-277, 2001.

Caselles, V., Kimmel, R., and Sapiro, G., "Geodesic Active Contours". International Journal of Computer Vision, pp. 61-79, 1997.

Lamdan, Y., Schwartz, J.T., and Wolfson, H.J., "Object Recognition by Affine Invariant Matching", Computer Vision and Pattern Recognition., pp. 335-344, 1988.

Riklin, T.R., Sochen, N., and Kiryati, N., "Mutual segmentation with level-sets". Proceedings of the 2006 Conference on Computer Vision and Pattern Recognition Workshop, 2006.

LaViola, J.J., Jr., "Double exponential smoothing: an alternative to Kalman filter-based predictive tracking", Proceedings of the workshop on Virtual environments, pp. 199-206, 2003.

LaViola, J.J., Jr., "An experiment comparing double exponential smoothing and Kalman filter-based predictive tracking algorithms", Proc. IEEE Virtual Reality, pp. 283-284, 2003.

Martin, A.F. and Robert, C.B., "Random Sample Consensus: A Paradigm for Model Fitting with Applications to Image Analysis and Automated Cartography". Communications of the ACM, pp. 381-395, 1981.

Belongie, S. and Malik, J., "Matching with Shape Contexts", IEEE Workshop on Contentbased Access of Image and Video Libraries, pp. 20, 2000.

Ling, H. and Jacobs, D.W., "Shape Classification Using the Inner-Distance". Pattern Analysis and Machine Intelligence, IEEE Transactions on, pp. 286-299, 2007.

Hagbi, N., Grasset, R., Bergig, O., Billinghurst, M., and El-Sana, J., "In-Place Sketching for Content Authoring in Augmented Reality Games", Proc. IEEE Virtual Reality, 2010.

* cited by examiner

SYSTEMS AND METHODS FOR TRACKING NATURAL PLANAR SHAPES FOR AUGMENTED REALITY APPLICATIONS

This patent application claims priority to U.S. Provisional Patent Application Ser. No. 61/251,757 filed on Oct. 15, 2009 which is incorporated by reference herein in its entirety.

FIELD AND BACKGROUND OF THE SYSTEM

The present system relates to systems and methods for tracking planar shapes for augmented-reality (AR) applications.

Augmented reality is a technology in which a user's perception of the real world is enhanced by rendering information generated using computerized virtual content, or a virtual scene, on top of the real world. The virtual content may include labels, 3D models, shading, and illumination. In order for the view of the real world and the virtual scene to align properly (i.e. to be properly registered), the pose (i.e. 3D position and orientation) and other properties of the real and virtual cameras must be the same.

Estimating the pose of a camera relative to the real world, or objects therein, is a task of an AR system. It should be noted that the virtual-reality (VR) and AR research communities often use the term "tracking" to describe a concept different from the computer-vision community. While tracking in VR and AR may generally refer to determining the pose of a camera and/or user relative to the world, tracking in computer vision may refer to data association (also called matching or correspondence) between different visual entities in consecutive frames of an image sequence.

Many different AR tracking methods and systems are available nowadays, including mechanical, magnetic, ultrasonic, inertial, and vision-based, as well as hybrid methods and systems, which combine the advantages of two or more technologies. The availability of powerful processors and fast frame-grabbers has made vision-based tracking methods desirable for various purposes due to their accuracy, flexibility, and ease of use.

Fiducial-based vision-based tracking is popular in AR applications due to the simplicity and robustness that such tracking offers. In the prior art, fiducials are physical objects of predefined shape (and possibly size), and are usually integrated with an identification mechanism for uniquely recognizing individual fiducials. Fiducials are placed in a scene and the camera position is calculated according to their locations in the images.

Since fiducials can be held and manipulated by a user in front of a camera, or mounted to different physical objects to be tracked, fiducials have become very useful for producing tangible interaction techniques, which in turn make better user interfaces. However, the obtrusive and monotonous appearance of predefined shaped fiducials often renders such fiducials unattractive for use in AR applications, since such fiducials require the application developer to "engineer the scene." This means that the application developer must somehow design a scene in which a obtrusive or monotonous fiducial is present, so that tracking may be accomplished using the fiducial.

In response Natural-Feature Tracking (NFT) methods are becoming more common. NFT methods rely on certain features found in the real world. However, the natural features that can be used should have some easily identified and somewhat unique characteristics. Thus, NFT methods limits tracking to highly-textured objects or environments in which prominent scene features can be robustly and quickly located in each frame. NFT methods usually exhibit increased computational complexity compared with fiducial-based methods, as well as reduced accuracy, since little is assumed about the environment to be tracked. NFT methods are less obtrusive and can provide more natural experiences. Nevertheless, such methods are difficult to use for creating natural user-interfaces.

Furthermore, in the prior art, recognition of general planar shapes (without any specific relation to AR) has been addressed from various directions. One of the approaches is based on the concept known in the computer-vision community as "geometric projective invariance."

Planar shapes have also been used for tracking in the prior art. Ruiz et al. (hereinafter referred to as Ruiz 2006) (Alberto Ruiz, Pedro E. López de Teruel and Lorenzo Fernández., "*Robust Homography Estimation from Planar Contours Based on Convexity*", European Conference on Computer Vision, pp. 107-120, 2006.) proposed a projective approach for estimating the 3D pose of shape contours. An invariant-based frame construction is used for extracting projective invariant features from an imaged contour. The features are used for constructing a linear system of equations in homogeneous coordinates that yields the camera pose. Although theoretically general, the construction proposed in Ruiz 2006 limits the scope of usable shapes by several assumptions on shape concavities, and limits the use of the method in AR applications. In addition, only sparse features are used in Ruiz 2006 for pose estimation, with no error minimization step for increasing the accuracy of the pose estimated.

Iterative optimization has been shown to be useful for tracking, as well as for refining given pose estimates. Fitzgibbon (hereinafter referred to as Fitzgibbon 2001) (Andrew W. Fitzgibbon., "*Robust registration of 2D and 3D point sets*", In Proc. British Machine Vision Conference, volume II, pp. 411-420, 2001) proposed a 2D registration method for point sets based on the Levenberg-Marquardt nonlinear optimizer. As pointed out in Fitzgibbon 2001, direct nonlinear optimization on point sets can be easily extended to incorporate a robust estimator, such as a Huber kernel, which leads to more robust tracking. Such a method can also account for curves as sets of points, although the method makes no use of the connectivity information offered by such curves.

A shape footprint, originally proposed by Lamdan et al. (hereinafter referred to as Lamdan 1988) (Lamdan, Y., Schwartz, J. T., and Wolfson, H. J., "*Object Recognition by Affine Invariant Matching*", Computer Vision and Pattern Recognition., pp. 335-344, 1988.)), is a construction that can be used for calculating a signature for a shape. Shape footprints have been proposed for the recognition of flat and rigid objects undergoing affine transformations.

Therefore, there is a need for tracking methods that are unobtrusive for various AR applications, while waiving the need to engineer the scene, and still maintaining the high levels of accuracy and robustness offered by fiducial-based tracking methods, as well as the user interaction opportunities inherent to fiducials.

SUMMARY

It is the purpose of the present system to provide methods and systems for tracking planar shapes for AR applications. Particularly, systems and methods for determining the pose of a camera relative to imaged natural planar shapes are described. Planar Shape fiducials offer various benefits for AR. Shape fiducials lend themselves to identification and pose estimation in cases of partial occlusion and moderate projective distortion due to their redundancy. Furthermore, shape fiducials are flexible and unobtrusive for use in many AR applications in which natural shapes carry contextual meanings, such as augmented books, catalogs, and printed advertisements. It is thus desirable to have systems and methods for tracking planar shapes for AR applications. Such systems and methods would, inter alia, overcome many of the problems described above.

The present system discloses systems and methods for tracking planar shapes for augmented-reality (AR) applications. Systems for real-time recognition and camera six degrees of freedom pose-estimation from planar shapes are disclosed. Recognizable shapes can be augmented with 3D content. Recognizable shapes can be in form of a predefined library being updated online using a network. Shapes can be added to the library when the user points to a shape and asks the system to start recognizing it. The systems perform shape recognition by analyzing contour structures and generating projective invariant signatures. Image features are further extracted for pose estimation and tracking. Sample points are matched by evolving an active contour in real time.

For the purpose of clarity, several terms are defined for use herein. The term "tracking" is used herein to refer to the process of estimating the position and orientation (i.e. pose) of a sensing device (e.g. a camera) substantially at every frame in AR applications. Tracking allows for correct registration. Correct registration is necessary between the sensing device and the real world in order to align augmented virtual models to the coordinate system of the real world.

The term "visual tracking" is used herein to refer to tracking in AR by analyzing a captured video feed. The video feed includes a sequence of images. Visual-tracking methods estimate the position and orientation of the device used to capture the video feed substantially at every frame.

The term "fiducial" is used herein to refer to an object in the real world that can be tracked according to its predefined geometric properties. For example, some popular fiducials are based on black square frames. A fiducial can usually be uniquely identified. This is made possible, for example, by integrating additional identity information inside the square frame (e.g. a unique pattern or a digital code encoding an ID number). When tracking is made according to fiducials, then the camera pose is calculated with reference to the fiducials.

The terms "natural-feature tracking" and "NFT" are used herein to refer to a family of visual-tracking methods that use prominent features to estimate the camera pose. Such techniques usually do not require predefined fiducials to exist in the video feed. Camera pose is usually calculated with reference to the geometric arrangement of the features which may be learned on the fly.

The term "homography" is used herein to refer to a transformation from one planar surface in space to another. More specifically, assuming a pinhole camera model and two images captured from two different locations and orientations of the camera in space, the homography is the rotation and translation of the camera between the two images.

The term "geometric invariant" is used herein to refer to a property of geometric configurations that remain unchanged under a certain class of transformations. Geometric invariants allow the current pose of an object to be ignored, and descriptors to be calculated for the object directly from real-world observations.

The term "active contour" is used herein to refer to a model for evolving contours by iteratively minimizing an energy term associated with a contour. In many cases, the energy is calculated as a sum of internal and external energies.

In the prior art, tracking in AR is performed: (a) using predefined object descriptions (e.g. fiducials), which limits the use of the application as only predefined objects are identified, or (b) using NFT methods, which require increased computational complexity and provide less accuracy.

These and further embodiments will be apparent from the detailed description and examples that follow.

BRIEF DESCRIPTION OF THE DRAWINGS

The present system is herein described, by way of example only, with reference to the accompanying drawings, wherein.

DETAILED DESCRIPTION

The present system relates to systems and methods for tracking planar shapes for AR applications. The principles and operations for providing such systems and methods, according to the present system, may be better understood with reference to the accompanying description and the drawings.

The system allows a camera to view a real-world scene and display it on some display device. Using the system, it is possible to add an image component to the real-world scene that is not part of the real-world scene. In fact, the system can operate when there is no advance notice of the real-world scene. The added image may be a computer rendered or animated image and the added image can be moved as the camera's point of view or relative position changes. The system accomplishes this by using natural feature tracking to confirm the camera pose and to add the appropriate virtual reality image to the scene.

Figure 1:
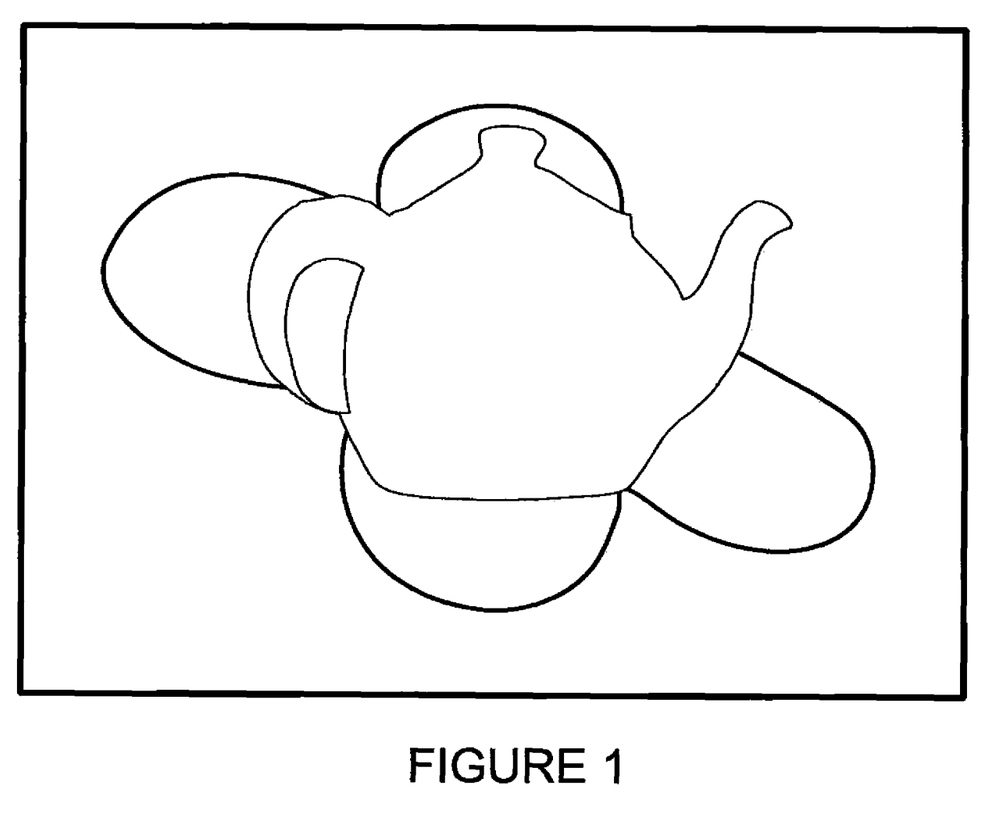
FIG. 1 is an illustration depicting a virtual teapot augmented on a handmade sketch of a flower, according to embodiments of the present system.

Embodiments of the present invention provide a recognition and 3D-pose tracking system for planar shapes. An aspect of the system is to serve as a 3D tracking solution for AR applications, which allows augmenting shapes that do not need to be predefined. FIG. 1 is an illustration depicting a virtual teapot augmented on a handmade sketch of a flower, according to embodiments of the present invention. FIG. 1 is an example of a handmade sketch that can be robustly tracked using embodiments of the present invention.

Figure 2A:
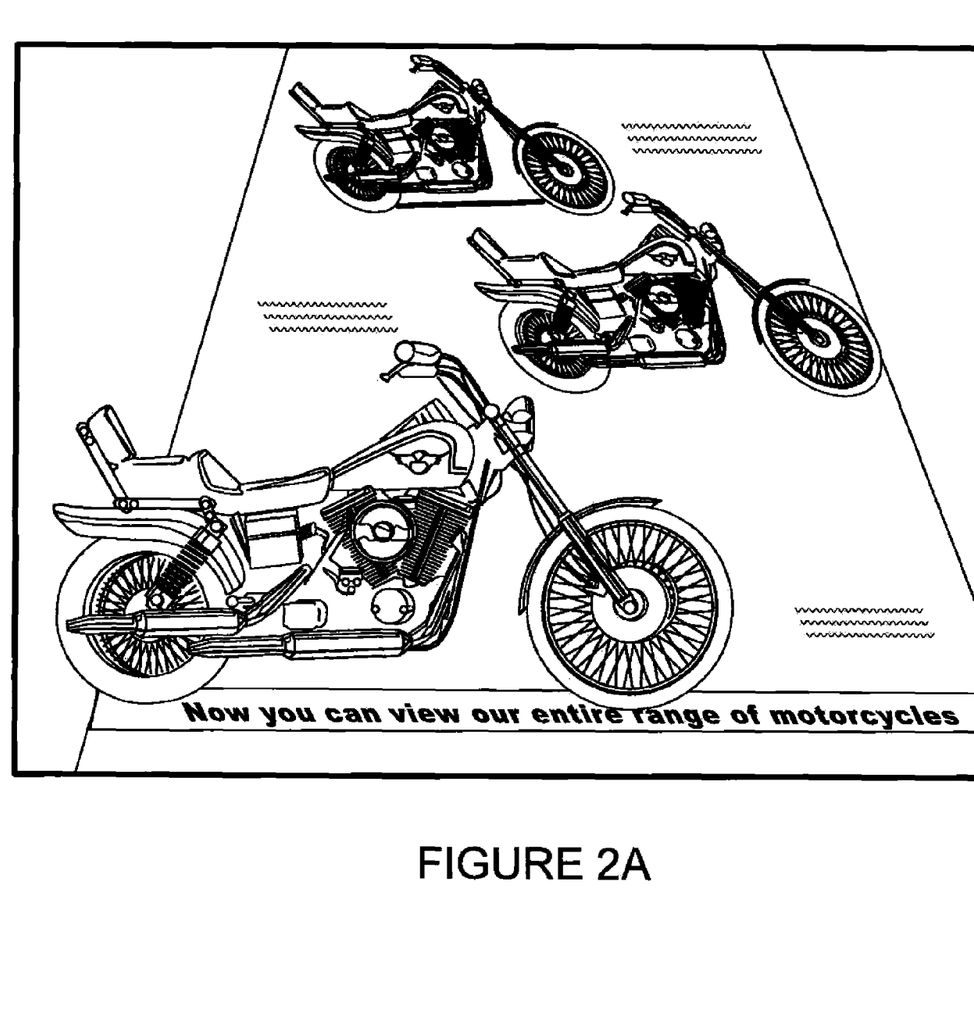
FIG. 2A is an illustration depicting the augmentation of a shape for AR applications, according to embodiments of the present system.

Embodiments of the present invention enable the development of a variety of applications in which tracking is based on natural shapes. For example, AR can improve the experience of browsing printed catalogs, making robust tracking methods for catalogs of distinct shapes useful. Using embodiments of the present invention, each shape in the catalog can point to a model, which can be augmented. FIG. 2A is an illustration depicting the augmentation of a shape for AR applications, according to embodiments of the present invention. FIG. 2A depicts a photo of a motorbike catalog page. The outline of the motorbike photo is used for augmenting a 3D model of a motorbike on top of the book page using embodiments of the present invention.

Figure 2B:
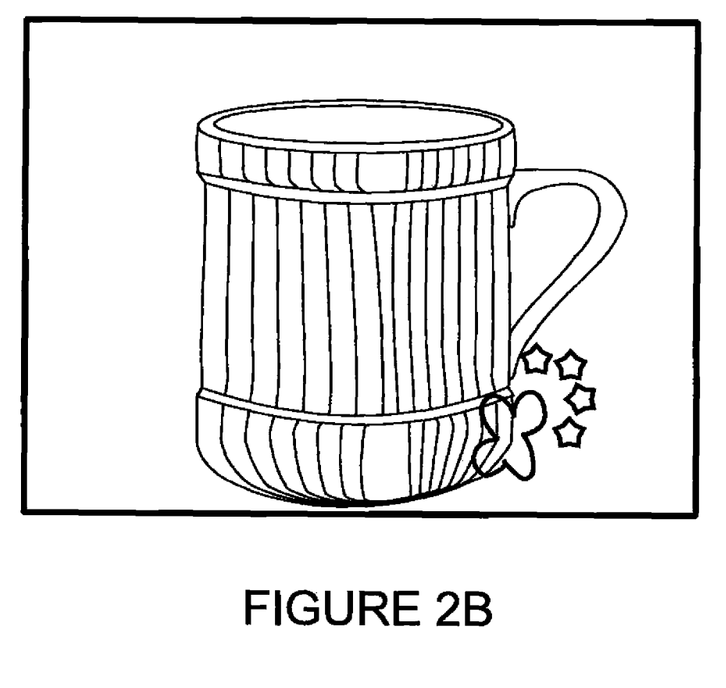
FIG. 2B is an illustration depicting another augmentation of a shape for AR applications, according to embodiments of the present system.
Figure 2C:
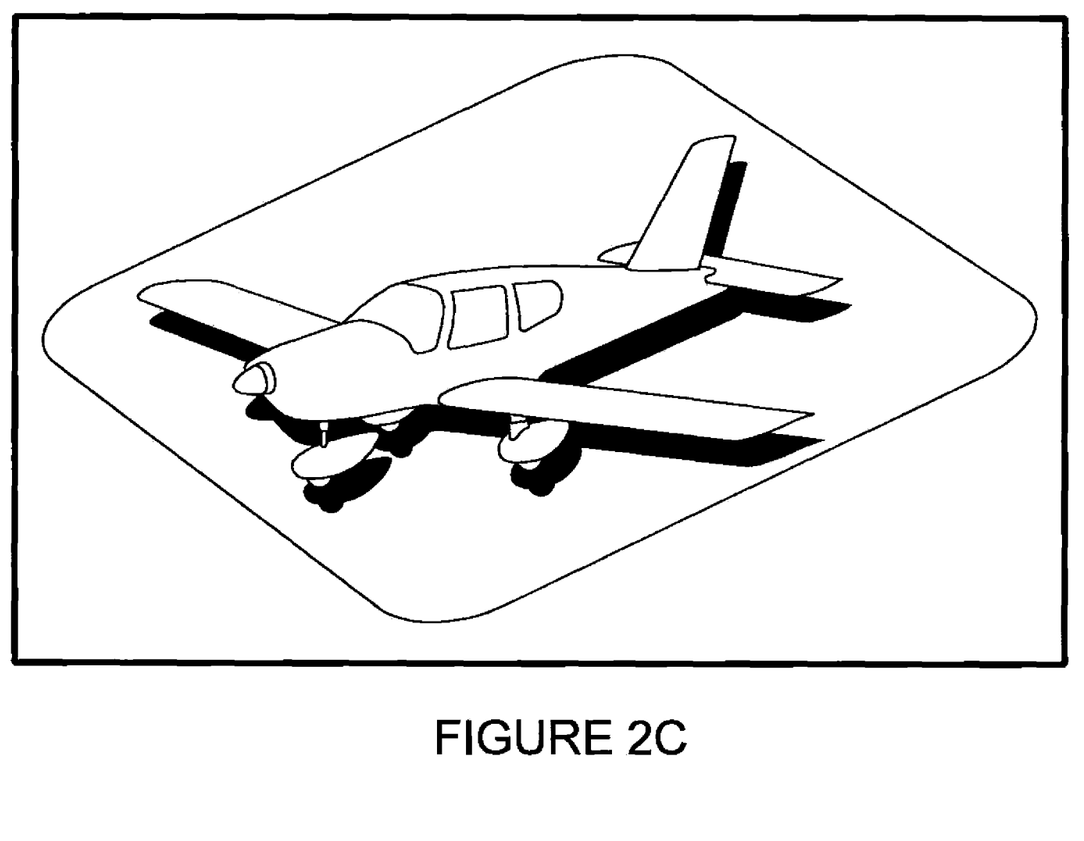
FIG. 2C is an illustration depicting another augmentation of a shape for AR applications, according to embodiments of the present system.

Embodiments of the present invention enable the development of AR applications based on logos. For example, logos printed on different kinds of media can be used for augmentation. A business card can point to a 3D model that downloads in real-time and appears on top of the business card. FIG. 2B is an illustration depicting another augmentation of a shape for AR applications, according to embodiments of the present invention. FIG. 2B depicts the logo augmentation of the HIT Lab NZ logo printed on the side of a mug.

Embodiments of the present invention enable the development of AR applications based on signs. For example, street signs can be used for augmentation. The type and location of the sign can point to a 3D model that downloads in real-time or exists on the device memory and appears augmented out of the sign.

Embodiments of the present invention enables the development of applications that combine sketching and AR. Sketching can be used for authoring AR content for interacting with existing virtual content, or simply for creating ad-hoc fiducials. The system enables hand sketches to be tracked to which 3D virtual content can be assigned.

Embodiments of the present invention enables the development of AR Game applications. The player can interact with augmented content, such as characters or animated models, by showing shapes to the camera which are used to set the position and orientation of the augmented content in the real environment.

Figure 6:
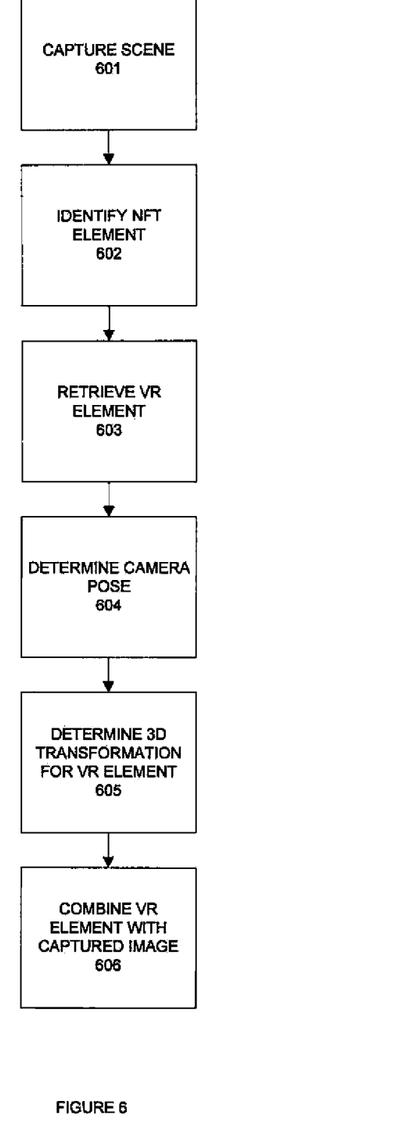
FIG. 6 is a flow diagram illustrating the operation of an embodiment of the system.

The flow diagram of FIG. 6 illustrates the operation of an embodiment of the system. At step 601 the system captures a frame of a scene. This may be via a video camera, a webcam, a personal computer, a game console device or a cellular phone equipped with a camera. The system analyzes the frame and identifies an NFT element at step 602. At step 603 the system analyzes the NFT element and searches a database, for a matching AR element. At step 604 the system determines the camera pose from the NFT element geometry. At step 605 the system determines a 3D transformation for the AR element based on the camera pose. At step 606 the system combines the transformed AR element with the captured image frame and displays it to the user.

Figure 7:
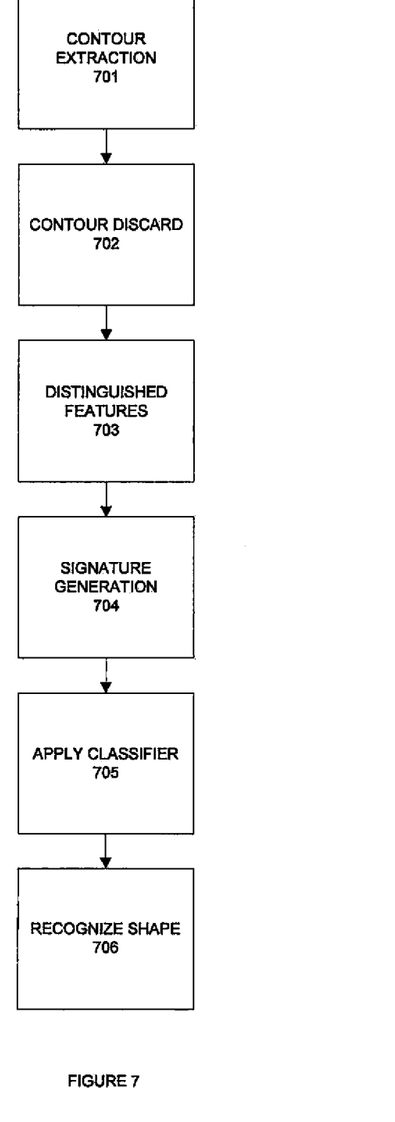
FIG. 7 is a flow diagram illustrating the operation of a process of FIG. 6.

FIG. 7 is a flow diagram illustrating an embodiment of the element identifying step 602 of FIG. 6. At step 701 the system performs contour extraction. At step 702 some contours are discarded if they fail to meet certain size and shape requirements. At step 703 distinguished features are identified that can aid in shape identification. At step 704 a signature is generated for the contours. At step 705 a classifier is applied to the contours and at step 706 the shape is recognized.

Figure 3:
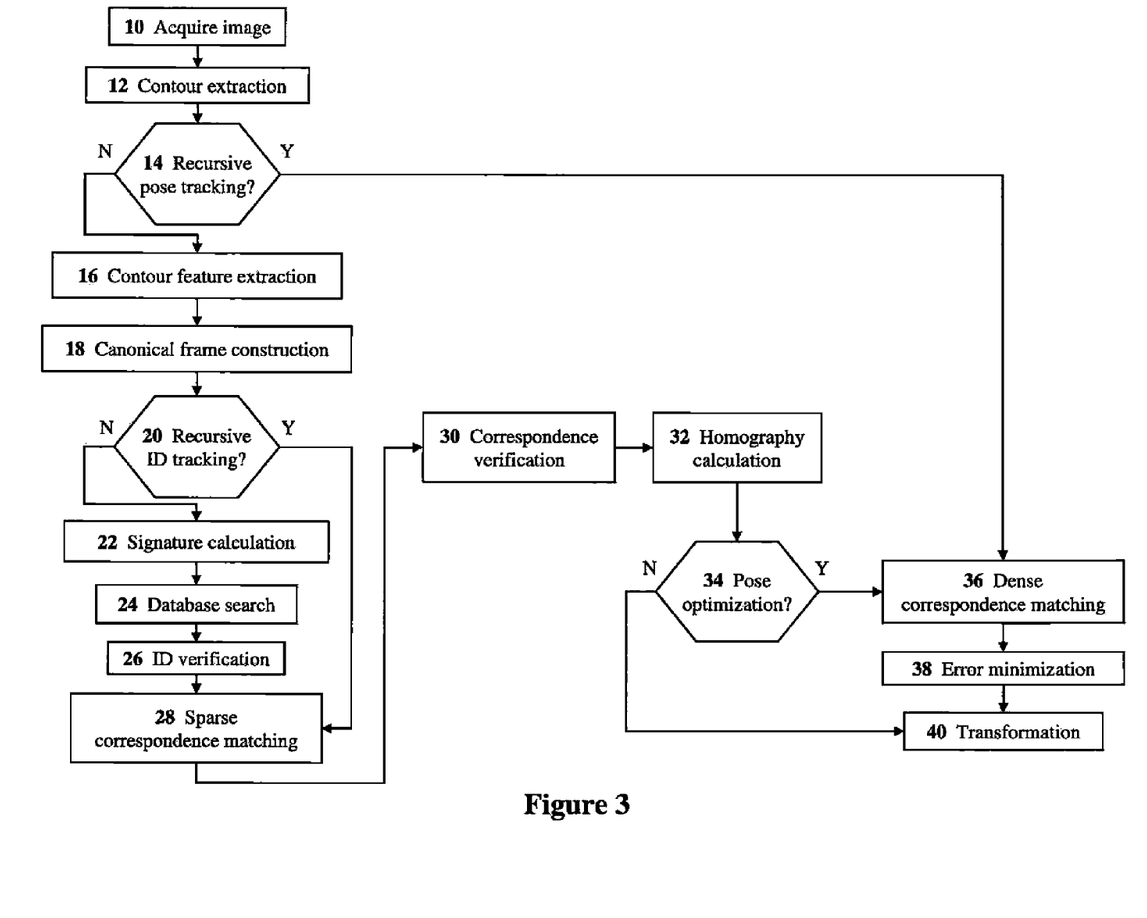
FIG. 3 is a flow diagram illustrating process steps for tracking planar shapes in AR applications, according to embodiments of the present system.

Referring now to the drawings, FIG. 3 is a flow diagram illustrating the process steps for tracking planar shapes in AR applications, according to embodiments of the present system. The process starts by acquiring a frame from a live video feed (i.e. a series of images) acquired by a camera (e.g. held by a user) (Step 10). For incoming frame, the system first performs a contour extraction in which the contours of shapes that appear in the acquired images are extracted (Step 12).

The system can operate for each shape in each frame in recursive tracking mode (i.e. using knowledge from previous frames [i.e. temporal information] to estimate the pose of shapes in the current frame), or in non-recursive tracking mode (i.e. estimating the pose of each shape in the frame anew) (Step 14). In the case of non-recursive tracking, contour feature extraction is performed in which features are extracted from each contour in the image (Step 16). Canonical frame construction is then performed, using the extracted features to transform the contour, or its parts (such as its concavities), into their canonical representations (Step 18) These canonical frames are next used for identification of the contour, if needed, as well as for pose estimation.

When recursive ID tracking is not used (Step 20), a projective invariant signature is calculated for each of the canonical representations (Step 22), and a database search step generates hypotheses for the contour identity from shapes stored in a database using the calculated projective invariant signatures (Step 24). The hypotheses are then verified, and the most appropriate shape is selected for each image contour (Step 26).

Sparse correspondence matching is then performed in which the features of an imaged contour and a library contour are matched (Step 28). The sparse correspondences are verified (Step 30), and an estimate of the homography between the contours is calculated (Step 32). The 3D pose of the contour is then calculated from the homography. In many cases, this 3D pose can be optimized (Step 34). In such cases, dense correspondence matching (Step 36) and error minimization (Step 38) are performed. This yields a 3D transformation for each shape contour (Step 40). Recursive pose tracking (Step 14) allows Steps 16-34 to be skipped, yielding a pose with relatively few calculations required. If recursive pose tracking is possible, dense correspondence matching (Step 36) takes place directly after contour extraction (Step 12). Similarly, recursive ID tracking (Step 20) allows Steps 22-26 to be skipped.

In other embodiments of the present system, recursive ID tracking (Step 20) can determine if tracking of shape identities can be performed based on previously analyzed shapes. This can be achieved by maintaining for each shape a set of ID tracking properties that can be efficiently and robustly tested to see if the shape corresponds to any shape in previous frames. For example, the properties used can be the centroid, length, and/or area of each shape.

In embodiments of the present system, image acquisition is performed using a sensing device (e.g. a video camera, a webcam, a personal computer, a game console or a cellular phone equipped with a camera).

In embodiments of the present system, one or more shapes within the image are determined in Step 12. This can be performed, for example, by "thresholding" the image with adaptive thresholding (e.g. using integral images, morphological operations, shape-connectivity checking, labeling methods, and edge linking). In embodiments of the present system, the contour of each shape in the image is extracted as a list of points $C^1=(p_1, p_2 \ldots p_n)$.

In embodiments of the present system, shapes are made of strokes and one or more shapes within the image are determined in Step 12. This can be performed, for example, by extracting strokes which may have stroke specific characteristics (e.g. stroke thickness). strokes can be extracted for example, by thresholding, morphological operations, connectivity checking, active contours, labeling methods, and edge linking. In embodiments of the present system, the contour of each stroke in the image is extracted as a list of points $C^1=(p_1, p_2 \ldots p_n)$.

In other embodiments of the present system, contours can be filtered (i.e. discarded from the process) if the contours do not comply with predefined requirements (e.g. minimal area, length, and concaveness).

In other embodiments of the present system, distinguished features (e.g. corners, sharp turns, and curves) are extracted from each non-discarded contour in Step 16. Properties of the distinguished features, such as their location relative to the shape contour, should be preserved under projective transformation.

Figure 4A:
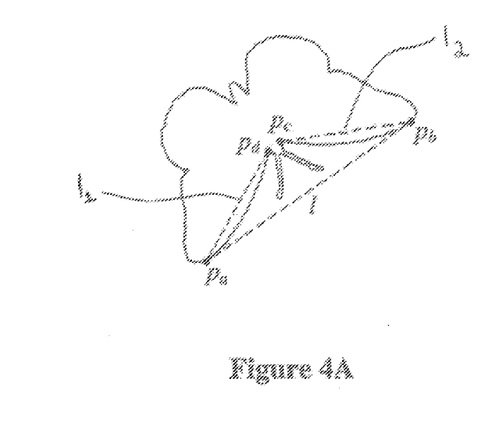
FIG. 4A is an illustration depicting the distinguished features of a contour concavity, according to embodiments of the present system.

In other embodiments of the present system, the distinguished features can be calculated. FIG. 4A is an illustration depicting distinguished features on a contour concavity, according to embodiments of the present system. A construction based on the bi-tangent line l to the contour, depicted in FIG. 4A, is formed. The bi-tangent line l gives two tangency points with the curve, $p_a$ and $p_b$, which segment a concavity from the rest of the curve. The important property of the bi-tangent line l and the points $p_a$ and $p_b$ is that their position relative to the curve remains unchanged under a change of viewpoint. In other embodiments of the present system, the bi-tangent line l and their bi-tangency points are extracted. This can be done, for example, by traversing the convex hull of the contour sequentially.

In other embodiments of the present system, two additional points for each concavity, $p_c$ and $p_d$, are extracted by casting from $p_a$ and $p_b$ lines $l_1$, $l_2$ tangent to the concavity. The extraction of these additional cast tangency points can be done, for example, while traversing the contour for bi-tangent lines. The four extracted points, $p_a$, $p_b$, $p_c$, and $p_d$, along with the bi-tangent line l and the cast tangent lines $l_1$, $l_2$, provide distinguished features for the case.

In other embodiments of the present system, the extraction of invariant feature points can be repeated recursively on nested concavities. These nested feature points can then be further used as additional distinguished features. In other embodiments of the present system, contours can be filtered (i.e. discarded from the process flow) if their distinguished features do not meet certain criteria (e.g. features are too close to each other).

Figure 4B:
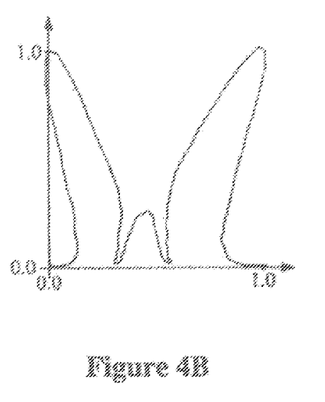
FIG. 4B is an illustration depicting canonical frame construction of a contour concavity, according to embodiments of the present system.

FIG. 4B is an illustration depicting a canonical frame construction for a contour concavity, according to embodiments of the present system. As depicted in FIG. 4B, frames that are preserved under projective transformations are constructed for each concavity (Step 18 of FIG. 3). The distinguished features are used for this purpose. This can be done, for example, by calculating a transformation that maps the distinguished features to the four corners of a unit square. This transformation can be applied to all of the concavity points, yielding the canonical representation of the concavity. For example, FIG. 4B is the lower-right concavity of the contour in FIG. 4A. It should be noted that the selection of the unit square is arbitrary and different selections are possible as well.

In other embodiments of the present system, contours can be filtered (i.e. discarded from the process flow) if their canonical representation does not meet certain criteria (e.g. the area under the concavity in the canonical frame is below a predefined threshold).

In other embodiments of the present system, a signature for each concavity of $C^1$ is calculated from its canonical representation (Step 22). In other embodiments of the present system, the signature can be based on the areas bounded between the transformed concavity curve and a set of rays $\{\eta\}$ cast in constant polar intervals from a point $p_{base}$ on the basis of the concavity canonical frame, midway between the transformed $p_a$ and $p_b$.

In other embodiments of the present system, the signature coordinate values can be set to be the bounded areas normalized by the total area bounded by the concavity in the canonical frame and the x-axis. For example, let us denote by $\eta$ the $i_{th}$ ray cast from $p_{base}$, and by $\alpha$ the area bounded by the concavity $\eta_i$ and $\eta_{i+1}$. The signature is then:

$$s=<s_1, s_2, \ldots s_n>$$

where $s_j=\alpha_j/\Sigma_{l-1}^{n-1}\alpha_l$ and n is the number of polar intervals.

In other embodiments of the present system, to support large shape libraries, a linear classifier on the shape signature can be used. In such a case, a training step can be used to teach the classifier the different shapes to be recognized. The signature space is then transformed into a new basis that allows signatures to be distinguished in a more robust manner.

In other embodiments of the present system, using the signature to perform a search in a database of known shapes can be performed (Step 24). In one implementation, the nearest neighbors of s can be found in the shape library using, for example, a hash map. In a another implementation the search method can be customized to the properties of the signature. For example, if some of the dimensions of the signature are more distinguishing than others, then a data structure can be used to index the database, which supports faster access to dimensions according to their importance by using an appropriate indexing method. In other embodiments of the present system, more than one database shape can be hypothesized as matching.

In other embodiments of the present system, for each image contour which has not been discarded, each hypothesized library shape is verified to yield a final match (Step 26). This can be done, for example, by projecting each hypothesized library shape $C^1$ against the image shape $C^1$, and testing for the re-projection error. The hypothesized library shape $C^L$, with minimal re-projection error is selected as matching. In other embodiments of the present system, the error metric can be based on the area common to the image shape $C^1$ and the re-projected library shape.

In other embodiments of the present system, the distinguished features of an image contour are matched to those of a reference contour $C^L$ to yield sparse correspondences (Step 28). The reference contour might be a contour for which the ID has been recursively tracked from previous frames, or for which the ID has been identified from a shape library. In other embodiments of the present system, distinguished features can be matched by matching different properties of the features or by matching the canonical frames, such as the areas bounded below the curve. Step 28 yields one or more sparse correspondence hypotheses.

In other embodiments of the present system, the sparse correspondence can be verified (Step 30). This can be done, for example, by calculating a re-projection error. The re-projection error is calculated by projecting the image shape on the corresponding library shape according to the correspondence hypotheses generated in step 28. Given the projection the error between the two shapes is measured. The hypotheses with the minimal error is selected. In other embodiments of the present system, contours can be filtered (i.e. discarded from the process flow) if their sparse correspondence verification does not meet certain criteria (e.g. the error is above a predefined threshold).

Figure 5A:
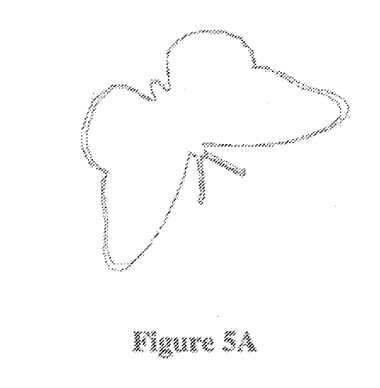
FIG. 5A is an illustration depicting a library shape contour re-projected on a tracked shape contour using a homography estimate, according to embodiments of the present system.

FIG. 5A is an illustration depicting a library contour re-projected using a homography estimate, according to embodiments of the present system. The homography H between the reference contour $C^L$ and the image shape $C^1$ is calculated in Step 32. This is done using the sparse correspondences of the distinguished features. Calculation can be carried out, for example, using a Direct Linear Transformation (DLT) algorithm. In other embodiments of the present system, distinguished lines are constructed between the distinguished features, and the distinguished lines are used for estimating the homography rather than the distinguished points. The tangent lines can provide a more stable homography across viewpoints. In other embodiments of the present system, conic fitting can be calculated for each distinguished point using its neighboring points to yield a more accurate distinguished point.

In other embodiments of the present system, the homography H can be recalculated more than once between Steps 30 and 32, each time trying a different correspondence in order to find the best correspondence. The best one can be selected, for example, by calculating the re-projection error.

In other embodiments of the present system, Dense Correspondence Matching can take place (Step 36), which allows for an optimization of the pose in a later step.

Figure 5B:
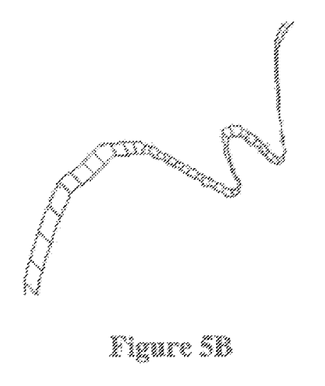
FIG. 5B is an illustration depicting contour-point correspondence matching using the distance transform as the external energy term, and stiffness and elasticity as the internal energy terms, according to embodiments of the present system.

FIG. 5B is an illustration depicting dense correspondence matching of two contours. The correspondence was calculated by evolving an active contour. Corresponding sample points are marked by connecting lines.

In other embodiments of the present system, an active contour is evolved from the re-projection of the reference contour $C^L$ toward the imaged contour $C^1$. To guide the active contour, an external energy term is used. For example, an energy term that depends on the distance transform of the image contour $C^1$ can be used. Evolving solely according to this term is possible, and is equivalent to casting a normal to the contour in each contour point. In other embodiments of the present system, internal terms can be used to preserve additional properties of the evolving contour. Terms for stiffness and elasticity of the contour can be added, yielding the following energy functional.

$$E(c(s)) = \alpha |DT(I(C_L))|^2 + \beta \left| \frac{\delta}{\delta_s} c(s) \right|^2 + \gamma \left| \frac{\delta^2}{\delta_s^2} c(s) \right|^2$$

Where c(s) denotes the re-projected library contour, I(*) denotes the binary image of a contour, DT(*) denotes the distance transform of a binary image, and $\alpha$, $\beta$, and $\gamma$, are weighting coefficients.

An evolved contour point ceases to evolve when the distance the point has traveled in a single iteration is smaller than a predefined threshold, or when a predefined number of iterations has been reached. The former condition helps to prevent the active contour points from moving along the contour. The resulting correspondence is depicted in FIG. 5B by connecting line segments.

In other embodiments of the present system, the internal energy terms make the active contour less susceptible to image noise, which can corrupt the normals at curve points, and maintain the structure of the curve. Embodiments of the present system can also take into account additional useful constraints. One such constraint may be integrating a known prior model of the contour. Other internal constraints and external constraints are possible as well.

In other embodiments of the present system, to avoid calculating the distance transform on the entire image, it is only necessary to calculate the distance transform in a narrow band around the contour $C^L$. Masking the distance transform calculation to a narrow band meaningfully reduces the per-frame processing time.

In other embodiments of the present system, a scheme can be used to completely avoid the distance transform calculation in each frame. Correspondence information can be calculated by un-projecting $C^1$ using the inverse homography $H^1$, and then evolving the unprojected curve toward $C^2$, rather than the other way around. Using such an approach, the distance transform image of $C^2$ is calculated and stored only once. Any subsequent image contours identified as matching $C^2$ will then use such a distance transform image for correspondence matching. Using such a scheme, the calculation of the distance transform image in each frame is avoided.

In other embodiments of the present system, the dense correspondence between $C^1$ and $C^L$ is used in an iterative error minimization algorithm for refining the homography H (Step 38). For example, Gauss-Newton or Levenberg-Marquardt iterative error minimization can be used. According to another embodiment of the present system, the error minimized is a function of the Euclidean distance between corresponding sample points on both contours.

In other embodiments of the present system, it can be determined whether tracking of shapes can be done on a frame to frame basis (Step 14). The process goes from contour extraction (Step 12) directly to dense correspondence matching (Step 36). The pose from the previous frame is hence refined. In other embodiments of the present system, determining whether recursive pose tracking (Step 14) is possible can be performed by measuring the stability and drift of the estimated pose.

In other embodiments of the present system, pose optimization (Step 34) is performed after the pose has been calculated from the homography (Step 32) to determine whether refinement of the pose is required. In case refinement is not required, the transformation is returned, and the process is complete. If optimization is required, then dense correspondence matching is performed (Step 36). The decision whether refinement is required can be based, for example, on the error of the pose, or on external constraints (e.g. limiting per-frame calculations to some predefined threshold).

In other embodiments of the present system, partial occlusion of the imaged shapes can be handled. This is possible due to the redundancy of distinguished features and contour information. It is enough to be able to identify one concavity in a shape to be able to perform the entire tracking process as depicted in FIG. 3. In other embodiments of the present system, additional concavities yield better accuracy. Hence, partial occlusions can be supported as long as one concavity of the shape is visible.

In other embodiments of the present system, different conditions, such as noise and bad lighting, may cause contour concavities to change dramatically. For example, a finger that occludes the tracked shape may generate a false part of the curve that does not exist originally in the shape. The occluded contour parts can be discarded, or their effect can be reduced during optimization by introducing a robust estimator.

In other embodiments of the present system, since pose is refined iteratively using an active contour, shapes which are only close to planar can be successfully recognized, and their pose can be estimated. In other embodiments of the present system, shapes that are close to planar may introduce a small and stable offset error. For example, in FIG. 2B, a logo of the HIT Lab NZ is printed on the side of an oval-shaped mug. Although the mug surface on which the logo is printed is not entirely flat, the shape is recognized and stable augmentation is performed.

Figure 8:
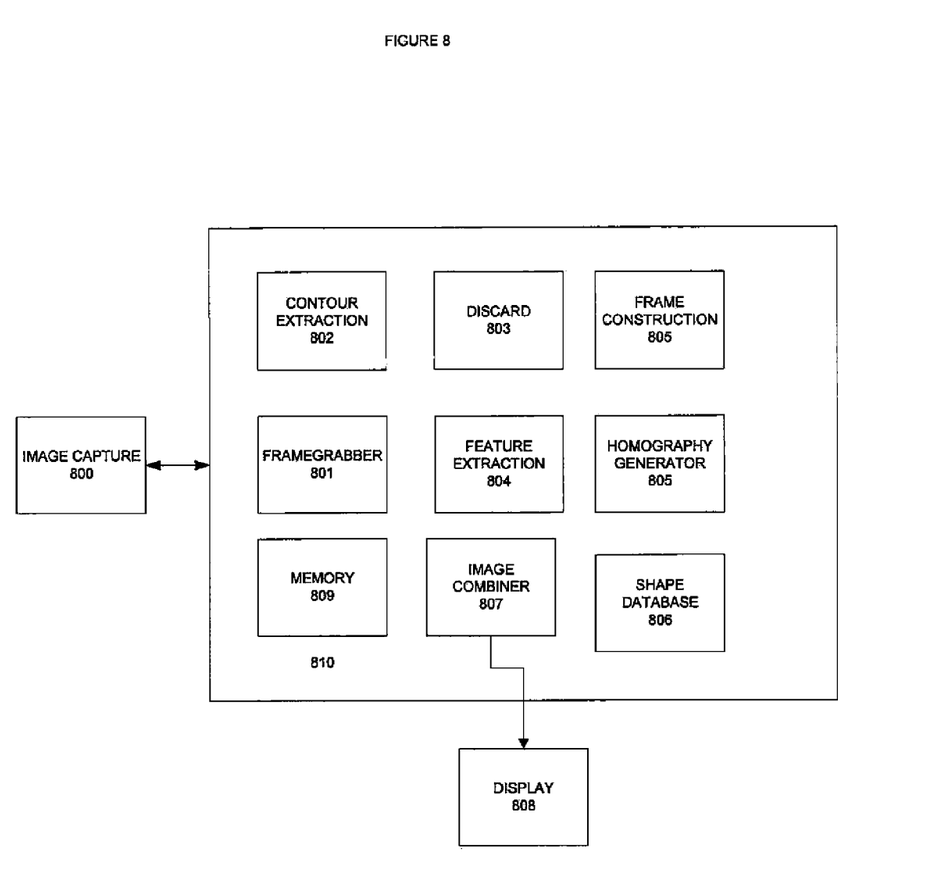
FIG. 8 is an example computer system that can be used for implementing the system.

The system can be implemented in software coupled to, or operating on, the image capturing device and associated processing system. FIG. 8 is an example hardware embodiment for implementing the system. The system includes an image capture device 800 coupled to a processing system 810 that includes system memory 809 and shape database 806. the processing system includes a frame-grabber 801 that provides image frames to the contour extractor 802 for extracting the contours from the image as described above. A comparator/discard module 803 is used to analyze the extracted contours and discard those that don't meet predetermined thresholds. A feature extractor module 804 determines distinguished features on the non-discarded frames and provides them to frame construction module 805 which is used as described above. Homography generator is used to compare the shapes in the database 806 based on the contour distinguished features and calculate the homography between the database shape and the image shape. Once a homography has been determined it is provided to the image combiner where the homography is applied on AR elements and they are combined with the image captured provided to display 808.

Example General Computer Environment

Figure 9:
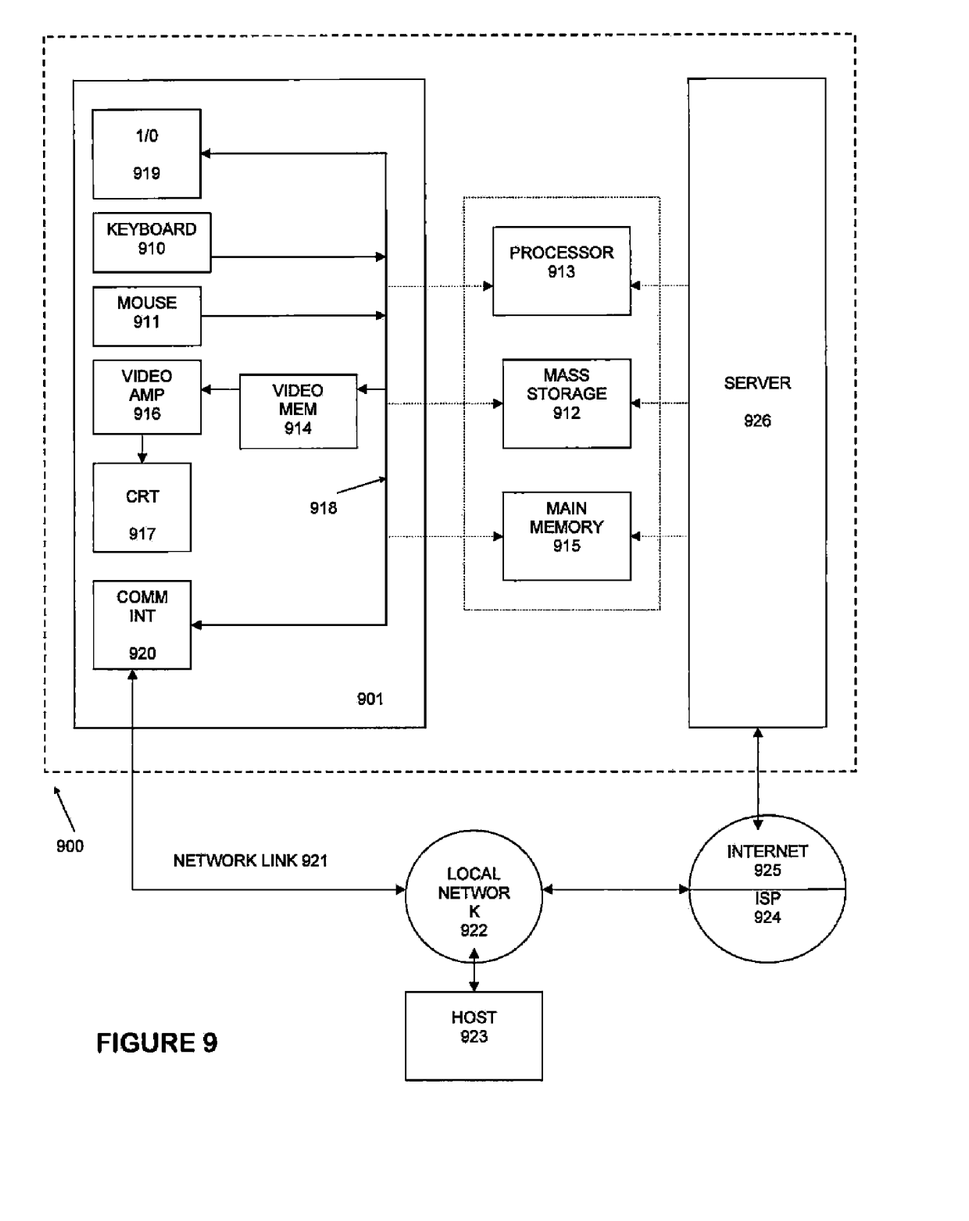
FIG. 9 is an example computer system for implementing an embodiment of the system.

An embodiment of the system can be implemented as computer software in the form of computer readable program code executed in a general purpose computing environment such as environment 900 illustrated in FIG. 9, or in the form of bytecode class files executable within a run time environment running in such an environment, or in the form of bytecodes running on a processor (or devices enabled to process bytecodes) existing in a distributed environment (e.g., one or more processors on a network). A keyboard 910 and mouse 911 are coupled to a system bus 918. The keyboard and mouse are for introducing user input to the computer system and communicating that user input to central processing unit (CPU 913. Other suitable input devices may be used in addition to, or in place of, the mouse 911 and keyboard 910. I/O (input/output) unit 919 coupled to bi-directional system bus 918 represents such I/O elements as a printer, A/V (audio/video) I/O, etc. Although described in terms of a general purpose computer, the system may also be implemented on mobile phones, touch screen computers, game consoles, PDA's, or any other suitable processing platform.

Computer 901 may include a communication interface 920 coupled to bus 918. Communication interface 920 provides a two-way data communication coupling via a network link 921 to a local network 922. For example, if communication interface 920 is an integrated services digital network (ISDN) card or a modem, communication interface 920 provides a data communication connection to the corresponding type of telephone line, which comprises part of network link 921. If communication interface 920 is a local area network (LAN) card, communication interface 920 provides a data communication connection via network link 921 to a compatible LAN. Wireless links are also possible. In any such implementation, communication interface 920 sends and receives electrical, electromagnetic or optical signals which carry digital data streams representing various types of information.

Network link 921 typically provides data communication through one or more networks to other data devices. For example, network link 921 may provide a connection through local network 922 to local server computer 923 or to data equipment operated by ISP 924. ISP 924 in turn provides data communication services through the world wide packet data communication network now commonly referred to as the "Internet" 925 Local network 922 and Internet 925 both use electrical, electromagnetic or optical signals which carry digital data streams. The signals through the various networks and the signals on network link 921 and through communication interface 920, which carry the digital data to and from computer 900, are exemplary forms of carrier waves transporting the information.

Processor 913 may reside wholly on client computer 901 or wholly on server 926 or processor 913 may have its computational power distributed between computer 901 and server 926. Server 926 symbolically is represented in FIG. 9 as one unit, but server 926 can also be distributed between multiple "tiers". In one embodiment, server 926 comprises a middle and back tier where application logic executes in the middle tier and persistent data is obtained in the back tier. In the case where processor 913 resides wholly on server 926, the results of the computations performed by processor 913 are transmitted to computer 901 via Internet 925, Internet Service Provider (ISP) 924, local network 922 and communication interface 920. In this way, computer 901 is able to display the results of the computation to a user in the form of output.

Computer 901 includes a video memory 914, main memory 915 and mass storage 912, all coupled to bi-directional system bus 918 along with keyboard 910, mouse 911 and processor 913.

As with processor 913, in various computing environments, main memory 915 and mass storage 912, can reside wholly on server 926 or computer 901, or they may be distributed between the two. Examples of systems where processor 913, main memory 915, and mass storage 912 are distributed between computer 901 and server 926 include thin-client computing architectures and other personal digital assistants, Internet ready cellular phones and other Internet computing devices, and in platform independent computing environments, The mass storage 912 may include both fixed and removable media, such as magnetic, optical or magnetic optical storage systems or any other available mass storage technology. The mass storage may be implemented as a RAID array or any other suitable storage means. Bus 918 may contain, for example, thirty-two address lines for addressing video memory 914 or main memory 915. The system bus 918 also includes, for example, a 32-bit data bus for transferring data between and among the components, such as processor 913, main memory 915, video memory 914 and mass storage 912. Alternatively, multiplex data/address lines may be used instead of separate data and address lines.

In one embodiment of the invention, the processor 913 is a microprocessor such as manufactured by Intel, AMD, Sun, etc. However, any other suitable microprocessor or microcomputer may be utilized. Main memory 915 is comprised of dynamic random access memory (DRAM). Video memory 914 is a dual-ported video random access memory. One port of the video memory 914 is coupled to video amplifier 916. The video amplifier 916 is used to drive the cathode ray tube (CRT) raster monitor 917. Video amplifier 916 is well known in the art and may be implemented by any suitable apparatus. This circuitry converts pixel data stored in video memory 914 to a raster signal suitable for use by monitor 917. Monitor 917 is a type of monitor suitable for displaying graphic images.

Computer 901 can send messages and receive data, including program code, through the network(s), network link 921, and communication interface 920. In the Internet example, remote server computer 926 might transmit a requested code for an application program through Internet 925, ISP 924, local network 922 and communication interface 920. The received code maybe executed by processor 913 as it is received, and/or stored in mass storage 912, or other non-volatile storage for later execution. In this manner, computer 900 may obtain application code in the form of a carrier wave. Alternatively, remote server computer 926 may execute applications using processor 913, and utilize mass storage 912, and/or video memory 915. The results of the execution at server 926 are then transmitted through Internet 925, ISP 924, local network 922 and communication interface 920. In this example, computer 901 performs only input and output functions.

Application code may be embodied in any form of computer program product. A computer program product comprises a medium configured to store or transport computer readable code, or in which computer readable code may be embedded. Some examples of computer program products are CD-ROM disks, ROM cards, floppy disks, magnetic tapes, computer hard drives, servers on a network, and carrier waves. We are in the age of downloading games from iTunes.

The computer systems described above are for purposes of example only. An embodiment of the invention may be implemented in any type of computer system or programming or processing environment.

While the system has been described with respect to a limited number of embodiments, it will be appreciated that many variations, modifications, and other applications of the system may be made.

What is claimed is:

1. A method for tracking a shape in an image, the method comprising using a processing system to perform operations comprising:
    analyzing the image and identifying at least one curved planar element, wherein analyzing the image and identifying the at least one curved planar element comprises extracting a plurality of contours from the image, discarding any contours that do not satisfy a threshold requirement, identifying, from at least one remaining extracted contour, at least one distinguished feature having a property that is geometric invariant under projective transformation, determining whether the at least one remaining extracted contour matches a contour from an earlier image frame, and recognizing the at least one remaining extracted contour associated with the at least one distinguished feature as the at least one curved planar element when the at least one remaining extracted contour matches the contour from the earlier image frame;
    determining a pose of an image capture device from the at least one curved planar element;
    determining a transformation for an augmented reality element associated with the at least one curved planar element based on the pose of the image capture device; and
    combining the augmented reality element with the image.

2. The method of claim 1 further comprising using the processor to display the augmented reality element with the image.

3. The method of claim 1 further comprising using the processor to compare an identified curved planar element to a plurality of stored augmented reality elements and to select a stored augmented reality element that most closely matches the identified curved planar element.

4. The method of claim 1 further comprising using the processor to generate a signature based on the at least one distinguished feature prior to recognizing the curved planar element.

5. The method of claim 4 further comprising using the processor to apply a classifier to the signature prior to recognizing the curved planar element.

6. The method of claim 1, wherein the threshold requirement comprises a size, position, orientation, or shape of the contour.

7. The method of claim 6 wherein the size and shape requirement comprises at least one of a minimum area, length, and concaveness of the contour.

8. The method of claim 6 wherein the position and orientation requirements comprise temporal information from at least one prior frame.

9. The method according to claim 1, wherein the distinguished feature having the property that is invariant under projective transformation is a corner, turn, or curve.

10. A method of tracking a shape in an image, the method comprising using a processor to perform operations comprising:
    extracting at least one image contour from the image;
    determining whether to apply recursive pose tracking to the at least one extracted image contour;
    when recursive pose tracking is not applied to the at least one extracted image contour, performing operations including extracting at least one feature from the at least one extracted image contour, wherein a property of the extracted feature is geometric invariant under projective transformation, matching the extracted image contour to a first library contour from an earlier image frame, calculating a homography between the extracted image contour and the contour from the earlier image frame, and generating a transformation of an augmented reality element based on the homography; and
    when recursive pose tracking is applied to the contour, performing operations comprising performing dense correspondence matching of the at least one extracted image contour to a second library contour from the earlier image frame, wherein performing the dense correspondence matching comprises defining an active contour, iteratively evolving each point of the active contour from a re-projection of the second library contour toward a corresponding point of the at least one extracted image contour, measuring a distance traveled by the active contour during each iteration, and ending the iteration when the distance traveled is below a threshold value or when a threshold number of iterations has been reached regardless of the distance measurement, minimizing error according to the correspondence, and generating a transformation of the augmented reality element according to the correspondence having the minimized error.

11. A method according to claim 10, wherein when recursive pose tracking is not applied the method comprises using the processor to perform operations further comprising:
    performing dense correspondence matching of the at least one extracted image contour to the first library contour, wherein performing the dense correspondence matching comprises defining an active contour, iteratively evolving each point of the active contour from a re-projection of the first library contour toward a corresponding point of the at least one extracted image contour, measuring a distance traveled by the active contour during each iteration, and ending the iteration when the distance traveled is below a threshold value or when a threshold number of iterations has been reached regardless of the distance measurement, minimizing error according to the correspondence, and generating a transformation of the augmented reality element according to the correspondence having the minimized error.

12. A method according to claim 10, wherein matching the extracted image contour to a first library contour comprises:
    constructing a canonical frame from the extracted feature, wherein constructing the canonical frame comprises calculating a transformation that maps the extracted feature to a planar shape;
    calculating a signature from the canonical frame;
    searching a library for a match to the signature; and
    verifying the matching.

13. A method according to claim 10, wherein, subsequent to calculating the homography, the processor performs operations comprising:
    determining whether performing pose optimization to the homography is required;
    when the processor determines that pose optimization is required, performing dense correspondence matching, minimizing an error associated with the dense correspondence matching, wherein generating the transformation of the augmented reality element is based on the correspondence having the minimized error; and
    when the processor determines that pose optimization is not required, proceeding to the transformation of the augmented reality element.

14. The method of claim 11 or 13, wherein performing the dense correspondence matching comprises calculating a distance transform, and wherein the calculated distance transform is used for dense correspondence matching of one or more features in subsequent images.

15. The method according to any one of claims 10-13 wherein the planar shape is a unit square.

16. The method according to claim 12, wherein the library comprises a signature corresponding to the first library contour from the earlier image.

17. An apparatus for tracking a shape in an image, the apparatus comprising processing means for analyzing the image, wherein the processing means comprises:
    a contour extraction module for extracting at least one contour from the image;
    a discard module for discarding any contours that do not meet a threshold requirement;
    a feature extraction module for extracting one or more features and distinguished characteristics associated with at least one remaining contour, wherein the one or more features and distinguished characteristics are geometrically invariant under projective transformation;
    a library for storing library shapes;
    a homography generator for matching the at least one remaining contour having the one or more features and distinguished characteristics that are geometrically invariant under projective transformation with a shape from an earlier frame, and for generating a homography based on the matching; and
    an image combiner for combining augmented-reality (AR) elements with the image based on the homography.

\* \* \* \* \*